(12) United States Patent
Popoli et al.

(10) Patent No.: US 8,634,484 B2
(45) Date of Patent: *Jan. 21, 2014

(54) METHOD FOR SUPPRESSION OF OFDM ENERGY SPECTRAL DENSITY FOR MINIMIZATION OF OUT OF BAND EMISSION OR UTILIZATION OF FRACTURED SPECTRUM

(75) Inventors: Robert F. Popoli, Rancho Palos Verdes, CA (US); John L. Norin, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/966,872

(22) Filed: Dec. 13, 2010

(65) Prior Publication Data

US 2011/0080983 A1  Apr. 7, 2011

Related U.S. Application Data

(63) Continuation of application No. 11/824,723, filed on Jul. 2, 2007, now Pat. No. 7,869,530.

(60) Provisional application No. 60/818,558, filed on Jul. 5, 2006.

(51) Int. Cl.
*H04K 1/10* (2006.01)

(52) U.S. Cl.
USPC ........... 375/260; 375/296; 375/267; 370/203; 370/208

(58) Field of Classification Search
USPC .................................................. 375/260, 346
See application file for complete search history.

(56) References Cited

U.S. PATENT DOCUMENTS 8,233,554 B2 * 7/2012 Karabinis ..................... 375/260

* cited by examiner

*Primary Examiner* — Eva Puente

(57) ABSTRACT

The Energy spectral density of OFDM signals inherently rolls off slowly. Slow OFDM spectral rolloff has system level implications traditionally mitigated by some combination of the following: addition of bandlimiting filtering; use of significant guard bands of zeroed tones; and, guard time shaping. Each of these techniques negatively impact system performance and/or flexibility. This application presents a methodology for active cancellation of out of band spectral energy. The technique can be used by itself or in conjunction with above traditional methods to help control out of band emission. Examples of the use of the new technique are provided. Computational cost of the new technique is also discussed.

20 Claims, 15 Drawing Sheets

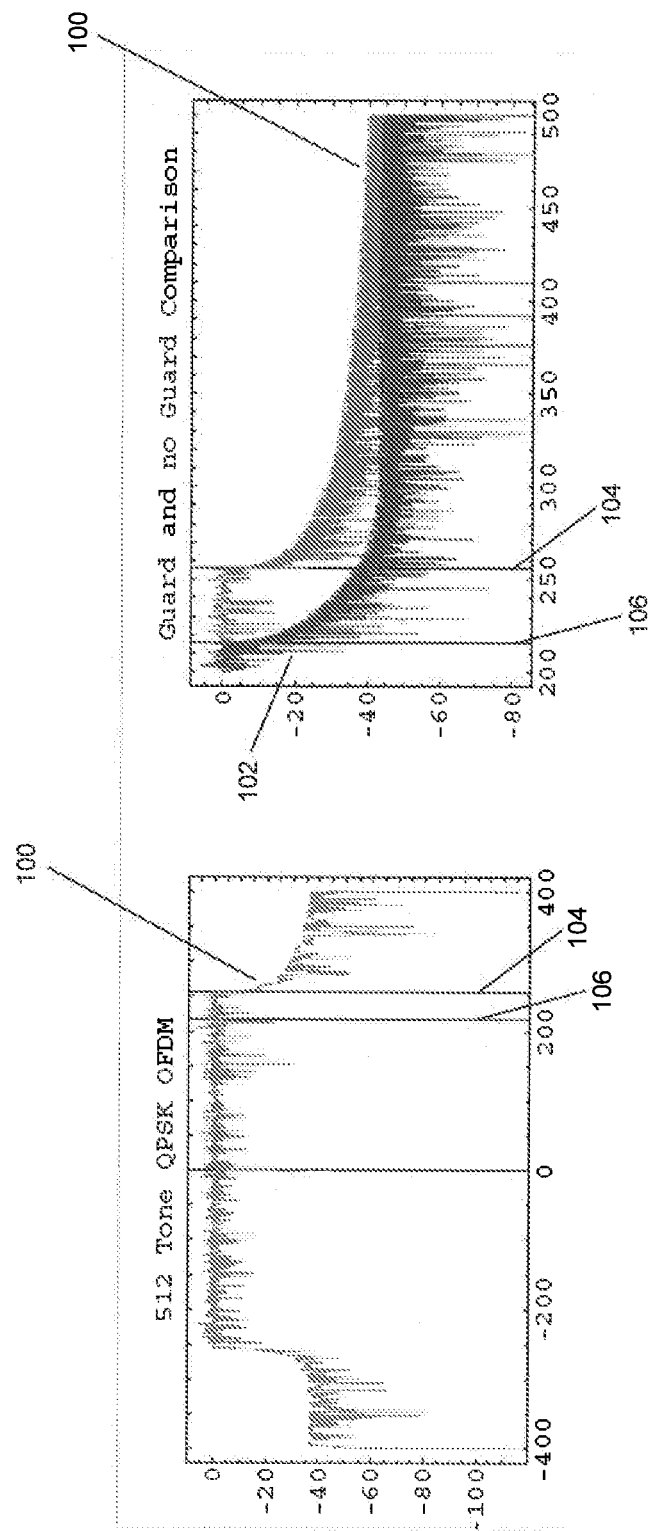

METHOD FOR SUPPRESSION OF OFDM ENERGY SPECTRAL DENSITY FOR MINIMIZATION OF OUT OF BAND EMISSION OR UTILIZATION OF FRACTURED SPECTRUM

CROSS-REFERENCE TO RELATED APPLICATIONS

This application is a continuation of U.S. Utility application Ser. No. 11/824,723, filed on Jul. 2, 2007, which claims the benefit under 35 U.S.C Section 119(e) of U.S. Provisional Application Ser. No. 60/818,558, filed on Jul. 5, 2006, by Robert F. Popoli and John L. Norin, entitled "METHOD FOR SUPPRESSION OF OFDM ENERGY SPECTRAL DENSITY FOR MINIMIZATION OF OUT-OF-BAND EMISSION OR UTILIZATION OF FRACTURED SPECTRUM," which applications are incorporated by reference herein.

BACKGROUND OF THE INVENTION

1. Field of the Invention

The present invention relates generally to wireless data systems, and in particular, to a method, apparatus, and article of manufacture for suppressing OFDM energy spectral density to minimize out-of-band emissions.

2. Description of the Related Art

Orthogonal Frequency Division Multiplexed (OFDM) signals are comprised of a set of subcarriers (also referred to as tones) which are constructed such that they are orthogonal to each other even though they overlap significantly in frequency. This is achieved as follows.

As far as the matched filter in the receiver is concerned (nuance here is that a cyclical prefix is added prior to transmission but removed prior to matched filter reception), each subcarrier, sk(t), during a symbol period, T, is a sinusoid of the form $$s_k(t) = \begin{cases} \sin(\omega_o k t) & 0 < t < T \\ 0 & \text{otherwise} \end{cases}$$

It is easy to establish the orthogonality of such symbols by verifying $$\int_0^T s_i(t) s_j(t) dt = \begin{cases} C & i = j \\ 0 & i \neq j \end{cases}$$

In the time domain, the symbols are equal to a sinusoid times a rectangular time window of length T. Therefore in the frequency domain, the energy spectral density of each symbol is the convolution of a dirac delta function .(!.!o) with a Sinc( ) function, T Sinc(fT) (which has nulls at f=k=T 8k=0.1; 0.2; : : : ). If the subcarrier spacing fo is set at $$f_o = \frac{\omega_o}{2\pi} = 1/T$$

then each subcarrier sits at the null of all other subcarriers. This is another way to recognize the orthogonality of the OFDM subcarriers. Thus, the baseband energy spectral density of the OFDM subcarrier $s_k(t)$ is given by $$S(f) = A_{i_k} \text{Sinc}(f - k f_o)$$

where $A_{ik}$ is the $i_{th}$ complex symbol which modulates the $k_{th}$ subcarrier during the $i_{th}$ symbol period. The composite OFDM energy spectral density of the $i_{th}$ symbol of all subcarriers is then just $$\sum_k A_{i_k} \text{Sinc}(f - k f_o)$$

The relevance of this is that the Sinc function falls off very slowly with frequency. Since each of the subcarriers falls off slowly with frequency so does the aggregate OFDM signal as can been seen in FIG. 1A.

FIG. 1A shows a typical energy spectral density sample 100 from a 512 tone QPSK modulated OFDM signal. FIG. 1A shows the characteristic slow roll off. There are several methods employed to help mitigate this slow roll off. One of the primary techniques is to specify that a certain number, NGuard, of tones at the edge of the band are to be dedicated "guard" tones which are in fact not energized.

FIG. 1B depicts this technique as it is specified in the 802.16 specification. The 802.16 common air interface calls for a number of tones to be unused at the edges (and a "zeroed" DC tone as well). The exact number of tones specified to be "zeroed" is a function of the FFT order (i.e. the number of tones) and other system parameters.

FIG. 1B depicts graph 100 in comparison with graph 102, where graph 102 uses a typical 512 tone scenario where 40 left hand tones are un-energized and 39 right hand tones are un-energized (i.e., NGuard=79). Marked on FIGS. 1A and 1B are point 104 are tones 255 where the upper end of the OFDM spectrum stops if no guard tones are used and point 106, at tone 216, where the upper end of the OFDM spectrum stops if guard tones are used. FIG. 1B shows via graph 102 what happens to the energy spectral density of the upper band edge when the guard tones are deployed. In essence, the energy spectral density is decreased when the active cancellation of the present invention is used.

If an adjacent system would like to deploy close to this OFDM signal, the use of the guard tones drops the Out Of Band (OOB) emission by approximately 30 dB at band edge (i.e., at tone 256). It can also be seen from FIG. 1B that since the spectrum falls off rather slowly from the point 255 on, adding more guard tones would only provide modest further improvement. It is important to note the expense of these guard tones. The guard tones represent 79/512 of the spectrum or 15.4%. Thus, the use of guard tones represents 15.4% wasted bandwidth.

Perhaps one of the most typical approaches to controlling OOB roll off is to simply bandpass filter the composite OFDM signal. This is done in most systems which need more roll off than that which is provided by the utilization of guard tones. Bandpass filtering has two significant disadvantages beyond the mere fact that it adds hardware (HW) complexity. The first disadvantage occurs when significant edge of band roll off is required. First, note that the spectral occupancy of an OFDM tone is actually quite large (recall from Eq. (5) that significant tone energy extends over many tone intervals). Due to the large spectral extent, a brick wall filter will cut off a significant amount of the energy of the outer edge tones and thus directly reduce the Signal to Noise Ratio (SNR) of the output of the matched filter receiver for these tones. This then affects the Bit Error Rate (BER) performance of the outer tones. Furthermore, a brick wall filter may have significant differential group delay which will affect the orthogonality of the outer tones relative to the rest of the OFDM set. This can affect the (SNR) of the inner tones since the edge tones will contribute to their Inter-Carrier Interference (ICI). Thus the BER performance of the inner tones will suffer.

In the case of a large scale deployment, the use of bandpass filters has potentially an even greater cost. In a large scale deployment, the available spectrum can change slightly with time and with location due to regulatory changes or spectrum negotiations. HW bandpass filters can make it very expensive to adjust for changes in available spectrum. This lack of flexibility can have enormous financial impact. On the subscriber equipment side, the issue is somewhat less severe since these units tend not to be the main source of inter system interference (they transmit at lower power and have less line of sight because subscriber equipment is not tower mounted). Furthermore, subscriber equipment can be dynamically directed to not use frequencies near band edge. Finally, subscriber HW can be constructed based on a narrower tunable BW, unlike a base station which must transmit simultaneously over the entire available BW. The above discussion has bearing on the application of the new technique of the present invention. Employing the proposed technique only on the base stations (where it is most practical) may be sufficient. Finally, another technique which can be used to shape the OOB spectrum is to provide a temporal shaping of the guard time. In OFDM, the symbols are temporally extended through the use of a cyclical prefix. This prefix is used to help mitigate multipath effects and is removed by the receiver prior to matched filtering. The 802.11 specification recommends such shaping as a potential approach but does not insist upon its use if OOB spectral masks can be met without it. The 802.16 specification does not suggest cyclical prefix shaping. The cost of this technique is added HW/computational complexity.

Furthermore, some studies suggest that to get enough benefit from the guard time shaping the cyclical prefix would need to be extended beyond that which is required for multipath mitigation to allow for more gradual rise times. Such extension would directly impact system capacity since it reduces symbol rate without increasing SNR.

No mention of the contribution of spectral regrowth due to High Power Amplifier (HPA) nonlinearities herein. OFDM tends to have a relatively large Crest Factor (CF). This requires the power amplifiers used for OFDM applications to be operated with an Output Back Off (OBO) on the order of 10 dB. Note that guard tones will help contain spectral regrowth somewhat by narrowing the transmitted spectrum. In contrast, note that bandpass filtering generally must be done prior to the HPA. Therefore, bandpass filtering will not be very helpful if HPA induced spectral regrowth of the bandlimited signal produces unacceptable OBO. Guard time shaping will similarly not help if spectral regrowth dominates.

Spectral regrowth due to HPA nonlinearities must be primarily mitigated through some combination of sufficient output backoff and CF management through data and or guard tone manipulation. More exotically non-linear pre-distortion can be attempted.

SUMMARY OF THE INVENTION

To minimize the limitations in the prior art, and to minimize other limitations that will become apparent upon reading and understanding the present specification, the present invention discloses methods for suppressing Orthogonal Frequency Division Multiplexing (OFDM) energy spectral density. A method in accordance with the present invention comprises transmitting data tones and at least one guard tone in a frequency band, and energizing the at least one guard tone wherein an extended spectral energy side lobe of the at least one guard tone cancels at least one extended spectral energy side lobe of the plurality of data tones in a specified region of the frequency band.

Such a method further optionally comprises the specified region of the frequency band being adjacent to a band edge of the frequency band, a plurality of guard tones are energized, the plurality of guard tones are selected based on a characteristic of the selected guard tones, and the characteristic is an orthogonality of the selected guard tones.

Another method in accordance with the present invention comprises selecting a set of cancellation tones to be used for energy spectral density cancellation, constructing a set of orthonormal basis vectors in at least one frequency region where the OFDM energy spectral density is to be cancelled based on the selected set of cancellation tones, computing a projection of a unity magnitude data modulated tone at each cancellation tone frequency onto the respective orthonormal basis vectors, employing a set of data excitations to scale the unity magnitude projections to find a projection of a side lobe of symbol data onto the set of orthonormal basis vectors, and applying the projection of the side lobe of symbol data to set an amplitude and a phase of each of the cancellation tones.

Such a method further optionally includes the set of cancellation tones are selected from a guard band of frequencies, at least one of the tones in the set of cancellation tones is selected from the guard band of frequencies, a frequency spectrum in the OFDM energy spectral density comprises a stay out zone, tones in the set of cancellation tones are selected from a first guard band and a second guard band, the first guard band is in a frequency spectrum immediately below the OFDM data band and the second guard band is in a frequency spectrum immediately above the OFDM data band, and the set of cancellation tones consists of either eight or fourteen cancellation tones.

BRIEF DESCRIPTION OF THE DRAWINGS

Referring now to the drawings in which like reference numbers represent corresponding parts throughout:

FIG. 1A illustrates an inherent energy spectral density of OFDM with no out-of-band suppression techniques applied;

FIG. 1B illustrates a Band Edge comparison with and without guard tone utilization;

DETAILED DESCRIPTION OF THE PREFERRED EMBODIMENTS

Figures 2A, 2B:
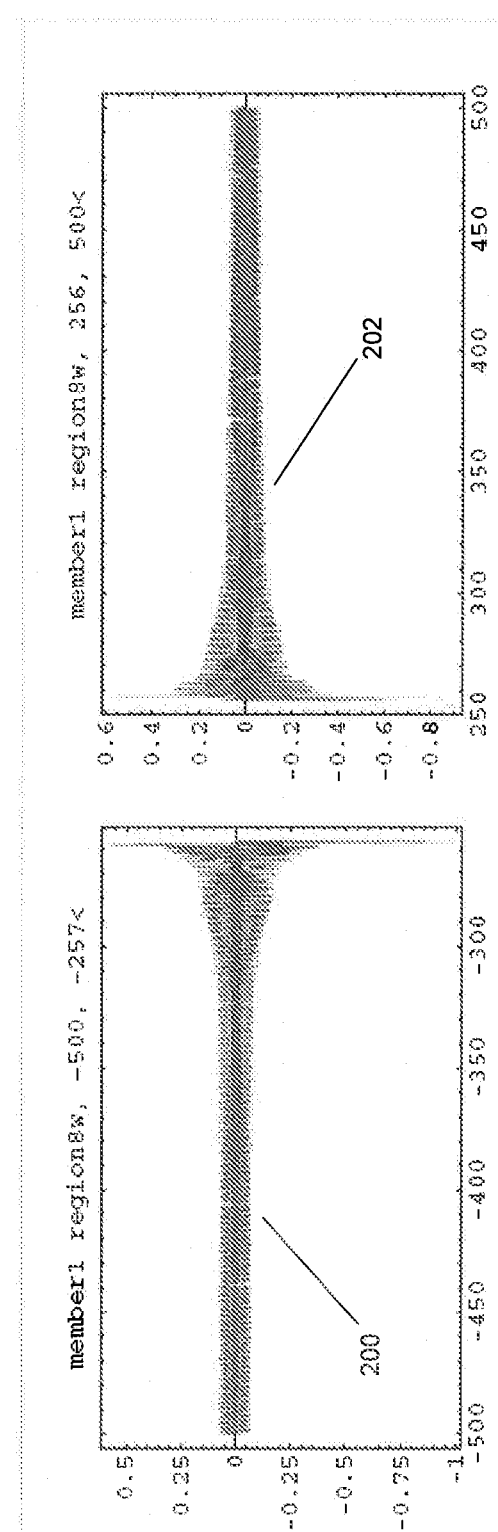
FIGS. 2A and 2B illustrate eight orthogonal basis vectors designed for cancellation in specific regions of the spectrum.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention uses active cancellation through the guard tones to cancel the extended spectral energy side lobes of the data tones in desired regions. The technique of the present invention mitigates OOB which can be used in conjunction with or instead of the above traditional techniques. The present invention energize some of the guard tones in such a way that their extended spectral energy side lobes cancel the extended spectral energy side lobes of the data tones in specified regions (generally regions adjacent to band edge).

The goal of the present invention is to do this in a way that is not excessively computationally burdensome. To this end, the goal is to try to structure the algorithm in such a way that the majority of the computational burden need not be done in real time. When used in conjunction with other techniques, the proposed technique has the advantage of achieving more OOB rolloff than would be practical to achieve with the traditional techniques alone. This additional OOB rolloff could increase the utility of spectrum which is otherwise too close to other already occupied spectrum or for which very strict regulatory masks have been established.

When used as an alternate to fixed HW band pass filtering, the technique has the significant advantage that it allows for software adaptation to slight changes in spectrum availability which might occur due to regulatory changes or future spectrum negotiations. For a wide scale deployment this factor could have financial significance.

Active OOB Cancellation

In order to provide a context for the detailed description of the proposed method, a brief summary of the approach is first presented. In outline form, the approach is:
1) Select a set of tones to be used for energy spectral density cancellation.
2) From the tones selected in Step 1, construct a set of orthonormal basis vectors in the frequency regions where the OOB energy cancellation is desired.
3) Compute the projection of a unity magnitude data modulated tone at each tone frequency k!o onto the orthonormal basis vectors found in Step 2.
4) For each ith symbol period, employ the set of data excitations Aik 8k to scale the unity magnitude projections found in step 3 to find the projection of the side lobes of the ith symbol's data onto the orthonormal basis set.
5) Use the results of Step 4 to set the amplitude and phase of each of the cancellation tones.

The degree of cancellation achieved will be the degree to which the selected cancellation tones span the space of the side lobes of the data tones in the area in which cancellation is being attempted. Some comments on the computation are in order. First, note that Step 1 through Step 3 can be pre-computed. When the algorithm details are presented, it will be shown that a significant portion of the computation of Step 4 can also be pre-computed.

Finally, once the data cancellation tones have been pre-selected, the entire algorithm is deterministic. No optimization search is required in real time. Thus the real time computational burden is completely known and constant during the real time operation.

The details of the algorithm are as follows. Assume the set of Ng cancellation tones $$g_i = \text{Sinc}\left(\frac{f - kf_o}{2\pi}\right) \text{ is given by the set } G.$$

$$G = \{g_i : i \in 1 \ldots N_g\}$$

Further, assume there are $N_r$ regions R in which energy spectral density suppression is desired and that these regions are given by $$R = \{\{\omega, R_{low_i}, R_{hi_i}\} : i \in 1 \ldots N_R\}$$

where the tuple indicates a region of frequency extending from $\omega = R_{low}$ to $\omega = R_{hi}$ in which spectral cancellation is attempted.

Orthonormal basis vectors are then established by iteratively computing a Gram Schmidt Orthogonalization. The first basis is computed as $$\Psi_1 = \frac{g_1}{\sqrt{\langle g_1, g_1 \rangle_R}} = \frac{g_1}{\|g_1\|_R}$$

and in general the nth basis is calculated as $$\Psi_n = \frac{g_n - \sum_{i=1}^{n-1} \langle g_n, \Psi_i \rangle_R \Psi_i}{\left\| g_n - \sum_{i=1}^{n-1} \langle g_n, \Psi_i \rangle_R \Psi_i \right\|_R}$$

Proceeding in this fashion, an orthonormal basis can be constructed. Each orthonormal basis $\Psi_n$ is thus defined as a mixture of the $g_i$ tones. These equations can be arranged in a matrix equation as $$\Psi = Cg$$

$$\begin{pmatrix} \Psi_1 \\ \Psi_2 \\ \vdots \\ \Psi_{N_g} \end{pmatrix} = \begin{pmatrix} c_{11} & 0 & \cdots & 0 \\ c_{21} & c_{22} & \cdots & 0 \\ \vdots & \vdots & \ddots & \vdots \\ c_{N_g 1} & c_{N_g 2} & \cdots & c_{N_g N_g} \end{pmatrix} \begin{pmatrix} g_1 \\ g_2 \\ \vdots \\ g_{N_g} \end{pmatrix}$$

Next, the inner product of unity scaled data tones $s_k$ (i.e. data tones with $A_{ik}=1$) with each of the basis vectors is pre-computed and arranged in a matrix B.

$$B = \begin{pmatrix} \langle s_{k_{min}}, \Psi_1 \rangle_R & \langle s_{k_{min}}, \Psi_2 \rangle_R & \cdots & \langle s_{k_{min}}, \Psi_{N_g} \rangle_R \\ \langle s_{k_{min}+1}, \Psi_1 \rangle_R & \langle s_{k_{min}+1}, \Psi_2 \rangle_R & \cdots & \langle s_{k_{min}+1}, \Psi_{N_g} \rangle_R \\ \vdots & \vdots & \ddots & \vdots \\ \langle s_{k_{max}}, \Psi_1 \rangle_R & \langle s_{k_{max}}, \Psi_2 \rangle_R & \cdots & \langle s_{k_{max}}, \Psi_{N_g} \rangle_R \end{pmatrix}$$

With these quantities in place, cancellation is achieved as described in steps 4 and 5 of the outlined procedure as follows. Form the tone excitation vector Ai for the ith data symbol as $$A_i = \begin{pmatrix} A_{i_{k_{min}}} & A_{i_{k_{min}+1}} & \cdots & A_{i_{k_{max}}} \end{pmatrix}$$

The projection of the data onto the basis vectors is then given by AiB.

The projection of this resultant on to the cancellation tone vector g yields the complex weights wi that need to be applied to the cancellation tones to achieve the active cancellation of the side lobe energy spectral density of the ith symbol. These weights are thus given by $$w_i = A_i BC$$

Only Ai is not known in advance. Therefore, the calculation BC can be performed in advance to yield a static compensation matrix H. Thus, the only real time operation which is required is the multiplication of the complex modulation weights Ai of the ith symbol by the static pre-computed compensation matrix H. This yields the desired complex cancellation tone weights wi for cancellation of the energy spectral density of the ith symbol set in the specified regions R. Thus $$w_i = A_i \mathcal{H}$$

The computational burden of the algorithm is as follows. Ai has dimensions 1. (NFFT.NGuard). For example, in the present case, Ai has dimension 1. (512.79)=1.433. The corresponding H has dimensions 433. Ng. In the next example, good results can be achieved with Ng (number of compensation tones) equal 8. Thus, the real time computational burden is the burden of the matrix multiply AiH. Thus, for this example, the burden is 1.433.8=3464 mac (mac=MultiplyAccumulate).

As a point of comparison, the normal implementation of OFDM uses an IFFT to generate the tones for transmission. Thus, for the 512 tone case, the computational burden to produce the data for transmission is the computational burden to perform a NFFT point IFFT. The Fast Fourier Transform has a computational burden of N Log 2(N). Thus, the computational burden of the OFDM generation is 512.9=4608 mac. By comparison, the active cancellation requires 3464 mac. Although the computational burden is not cheap, it is not unreasonable. Further, for a NFFT=1024 the normal OFDM computation burden rises a little faster than linearly to 10240 mac while the burden of active cancellation rises linearly to 6928 (assuming the same guard ratio and same number of cancellation tones).

Sample Results—Case 1

The first case is the active cancellation of the regions just outside the passband. The 512 tone QPSK modulated OFDM signal with 79 guard tones as shown in FIG. 1B is the starting point. Eight of these guard tones were selected for active cancellation of the energy spectral density in two regions just outside the passband. The lower region starts at the last active tone at −257 and extends out to the equivalent of tone −500. The upper cancellation region starts at the last active tone at 256 and extends to the equivalent of tone 500. The 8 guard tones which are energized to achieve cancellation are {256, 0.241, 0.226, 0.211, 210, 225, 240, 255}.

Figure 3:
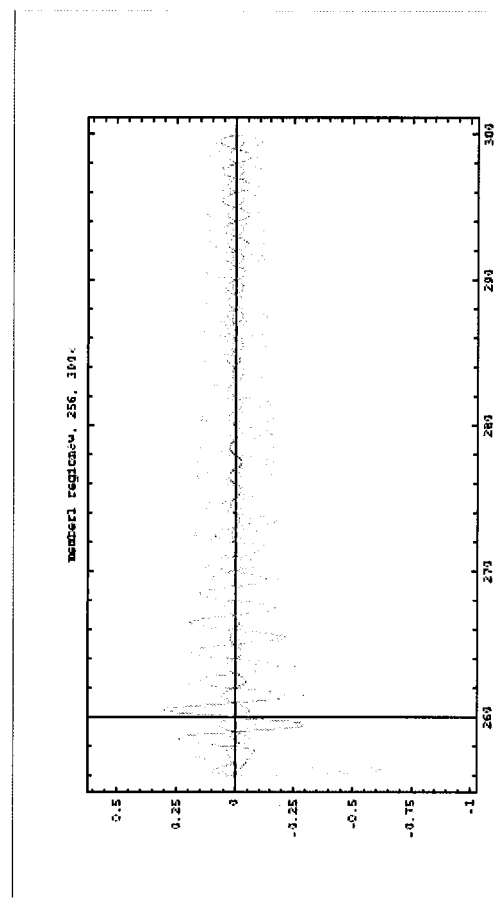
FIG. 3 shows a close up of the eight orthogonal basis vectors in part of the upper region of the spectrum.

FIGS. 2A-2B shows the set of 8 orthogonal basis vectors that were formed. FIG. 2A illustrates the eight vectors 200 that were used in the lower cancellation region and FIG. 2B illustrates the eight vectors 202 that were used in the upper cancellation region. FIG. 3 shows a close up of the base vectors in a portion of the upper region.

Figure 4:
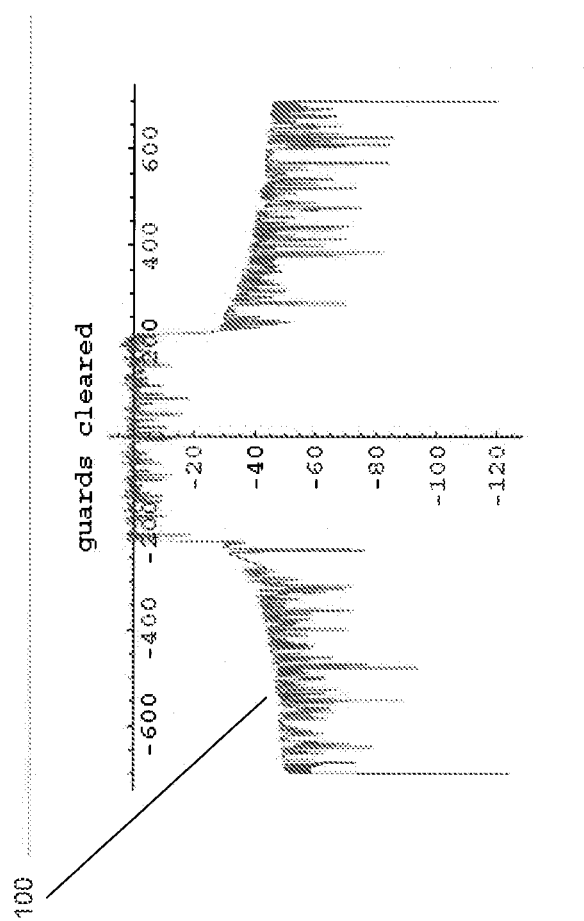
FIG. 4 illustrates an energy spectral density prior to active cancellation.
Figure 5:
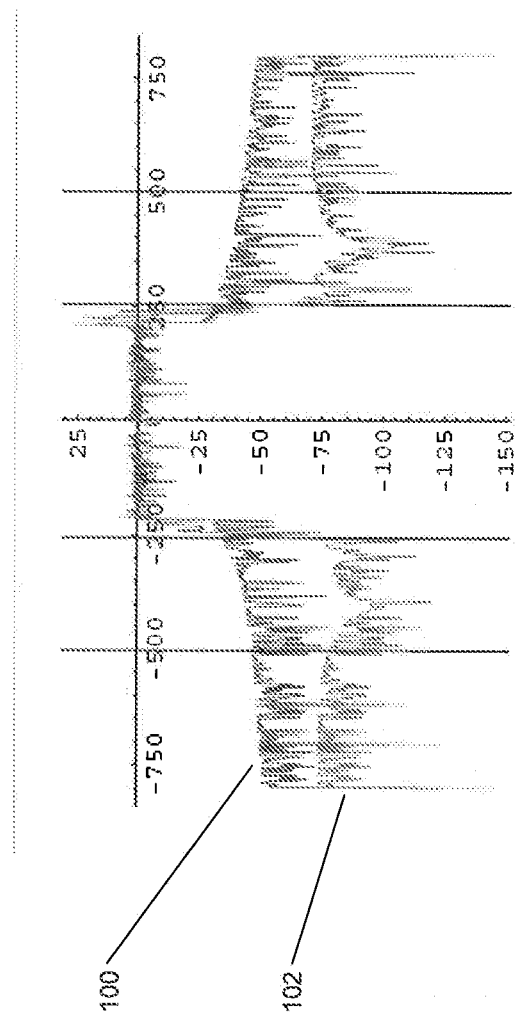
FIG. 5 shows the energy spectral density after active cancellation.
Figure 6:
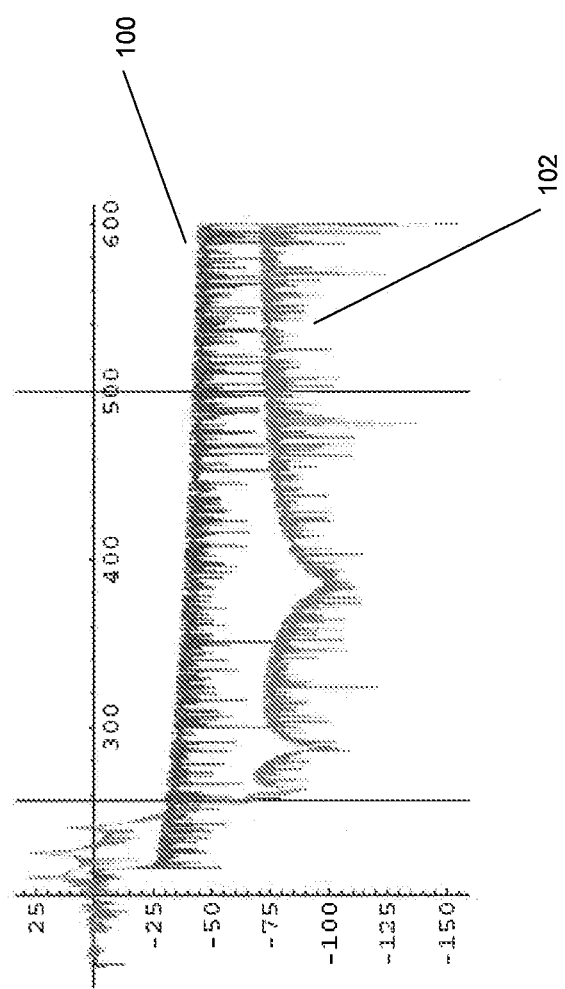
FIG. 6 shows a close up of upper cancellation region results.
Figure 7:
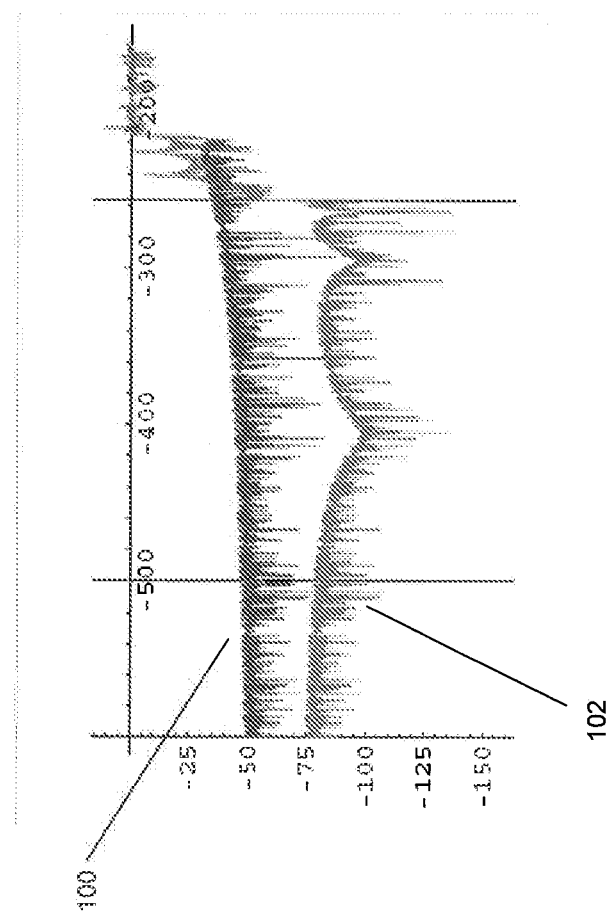
FIG. 7 illustrates a close up of the lower cancellation region results.

FIG. 4 illustrates a typical energy spectral density, similar to that shown in FIG. 1A, as graph 100. FIG. 5 shows the energy spectral density after cancellation, with graph 100 and graph 102 shown for comparison. FIG. 6 shows a close up of the upper cancellation portion, which shows approximately 30-40 dB of cancellation for the energy spectral density across the spectrum. FIG. 7 illustrates the lower cancellation region, which achieved similar results as those shown for the upper cancellation region in FIG. 6.

Sample Results—Case 2

The next case is an extension of the first. The setup is similar except that a third cancellation region was added which extended from tone 30 to tone 50. This allowed for the case where the available spectrum is fractured into two by an intervening stay out zone (from tone 30 to 50). The goal was to see how much cancellation could be achieved across the three zones. Guard tones were added on either side of the stay out zone such that tones 0 through 80 were not used for data. Additional energized tones were added to the 8 used in Case 1. The new energized cancellation tones for this case were {1, 14, 29, 52, 67, 82}.

Figure 8:
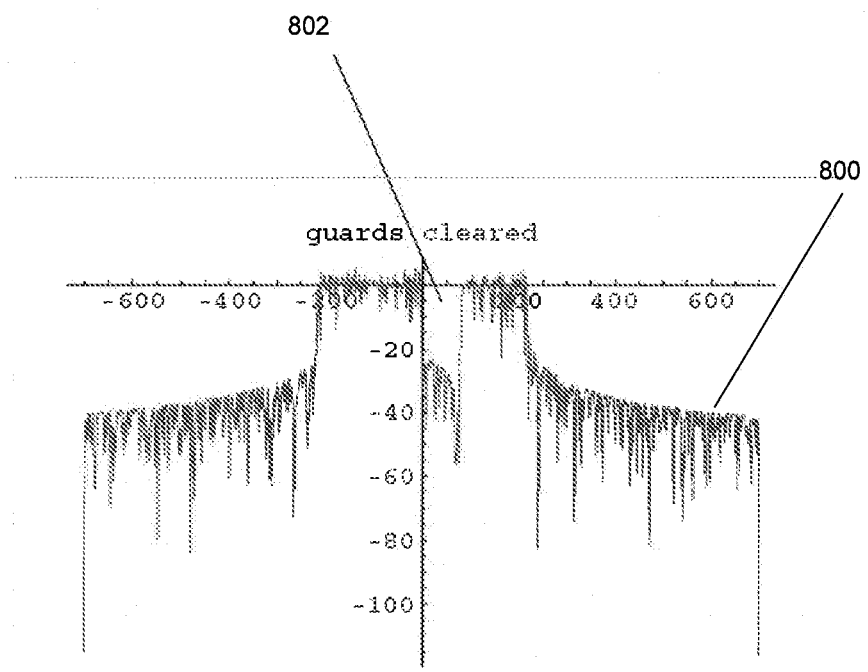
FIG. 8 illustrates an energy spectral density graph prior to active cancellation.
Figure 9:
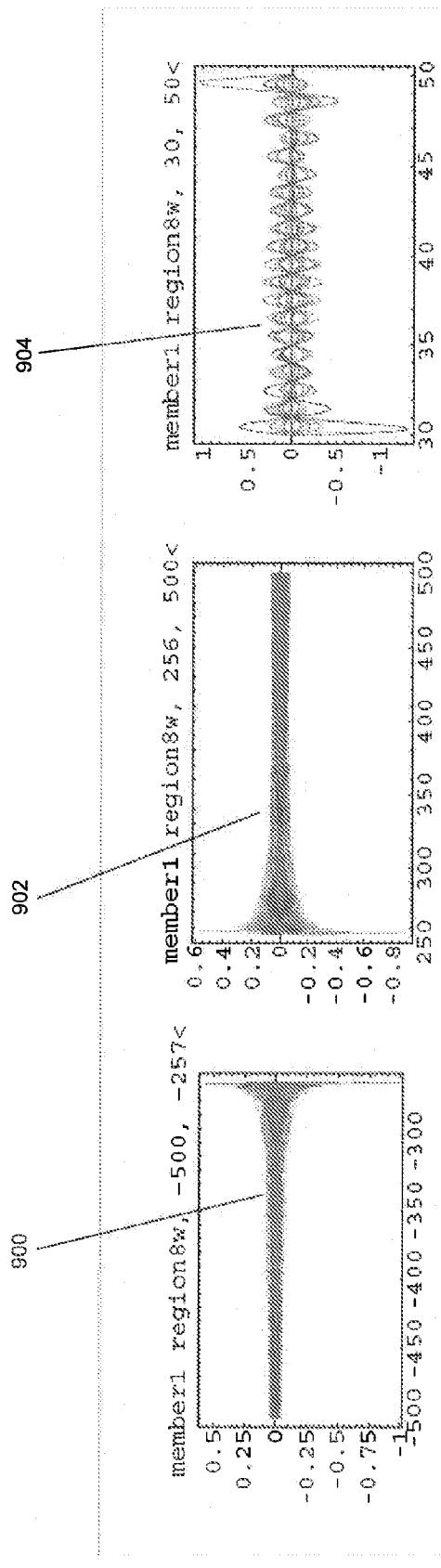
FIG. 9 illustrates fourteen orthogonal basis vectors designed for cancellation in three depicted regions.

FIG. 8 shows the pre-compensated input 800 with stay-out zone 802. FIG. 9 illustrates shows the 14 developed orthogonal cancellation signals, lower cancellation zone signals 900, upper cancellation zone signals 902, and stay-out zone cancellation signals 904, with tone number on the x axis.

Figure 10:
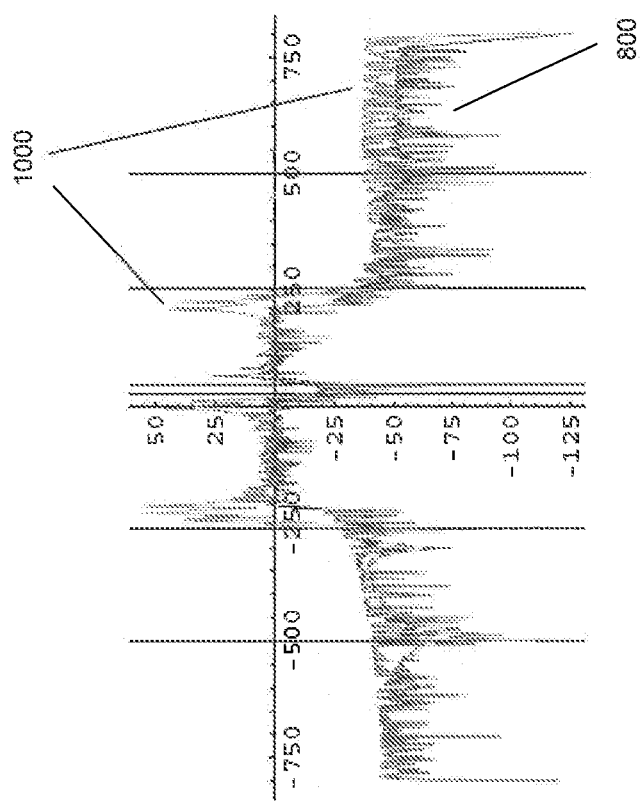
FIG. 10 shows the energy spectral density after active cancellation.
Figure 11:
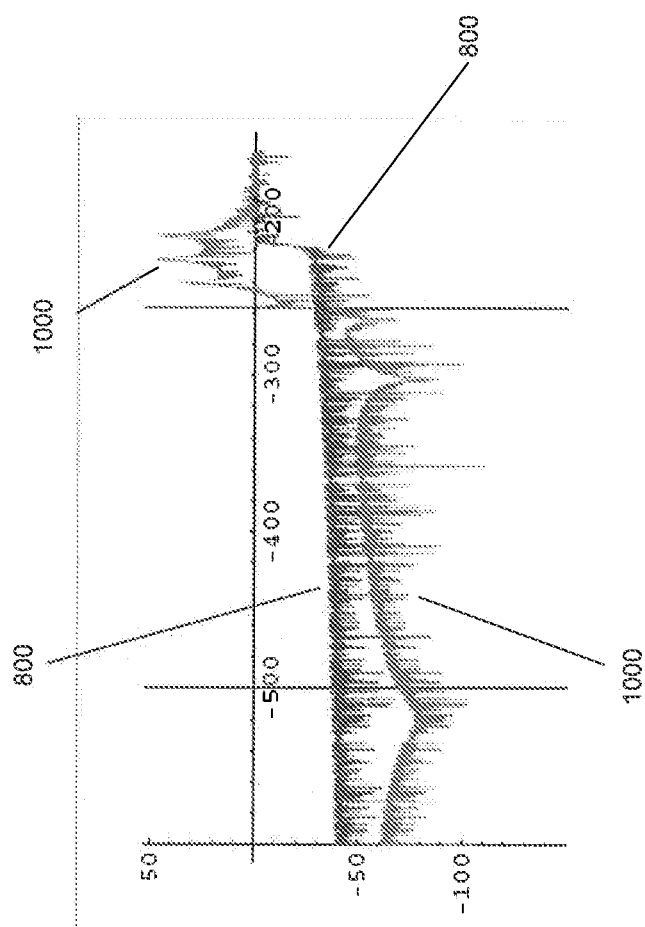
FIG. 11 shows a close up of cancellation region 1 results.
Figure 12:
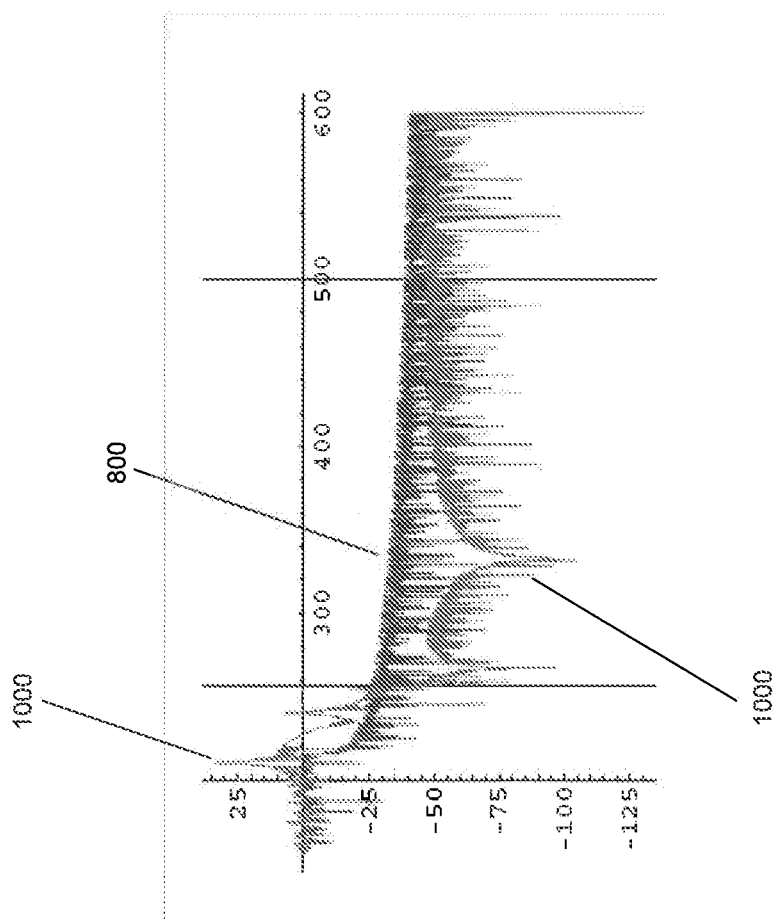
FIG. 12 shows a close up of cancellation region 2 results.
Figure 13:
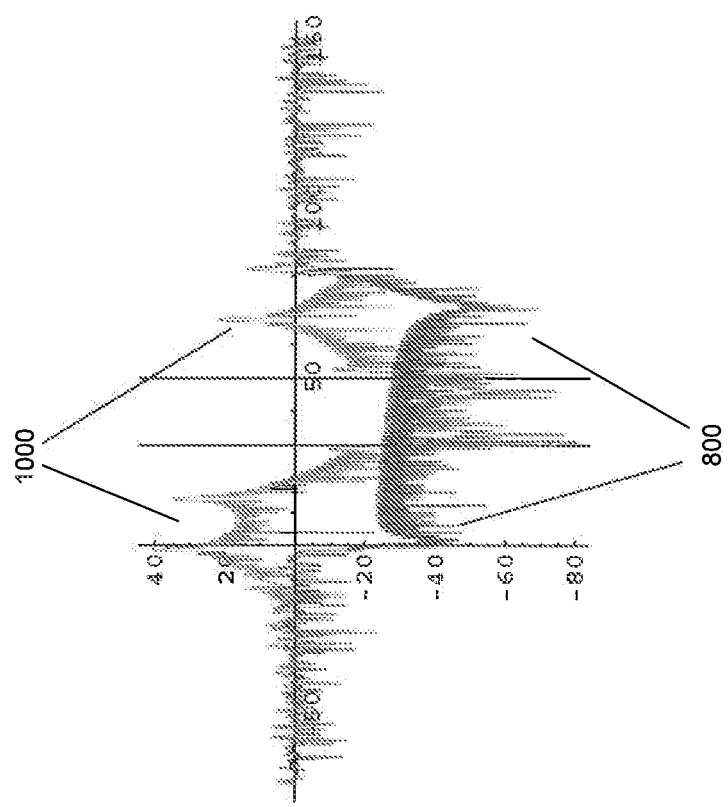
FIG. 13 shows a close up of cancellation region 3 results.

FIG. 10 illustrates the cancellation effects in graph 1000 as compared to input 800. FIG. 11 shows the lower cancellation region in more detail, again with graph 1000 compared to input 800. FIG. 12 shows the upper cancellation region in more detail, again with graph 1000 compared to input 800. FIG. 13 shows the stay-out zone cancellation region in more detail, again with graph 1000 compared to input 800. It may therefore be useful to combine the technique of the present invention with CF management or waveform predistortion.

Process Chart

Figure 14:
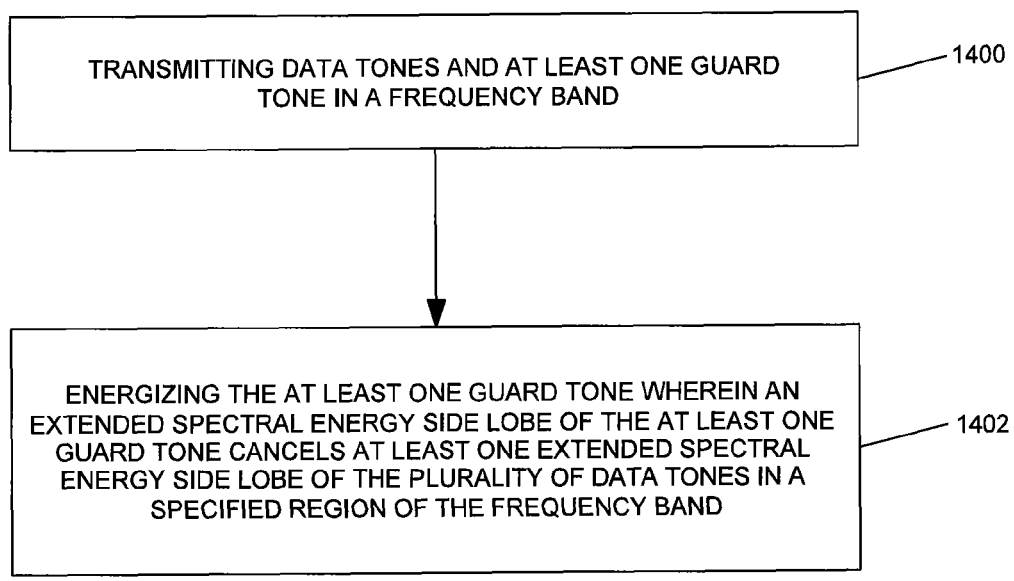
FIGS. 14 and 15 illustrate preferred processes in accordance with the present invention.

FIG. 14 illustrates a preferred process in accordance with the present invention.

Box 1400 illustrates transmitting data tones and at least one guard tone in a frequency band.

Box 1402 illustrates energizing the at least one guard tone wherein an extended spectral energy side lobe of the at least one guard tone cancels at least one extended spectral energy side lobe of the plurality of data tones in a specified region of the frequency band.

Figure 15:
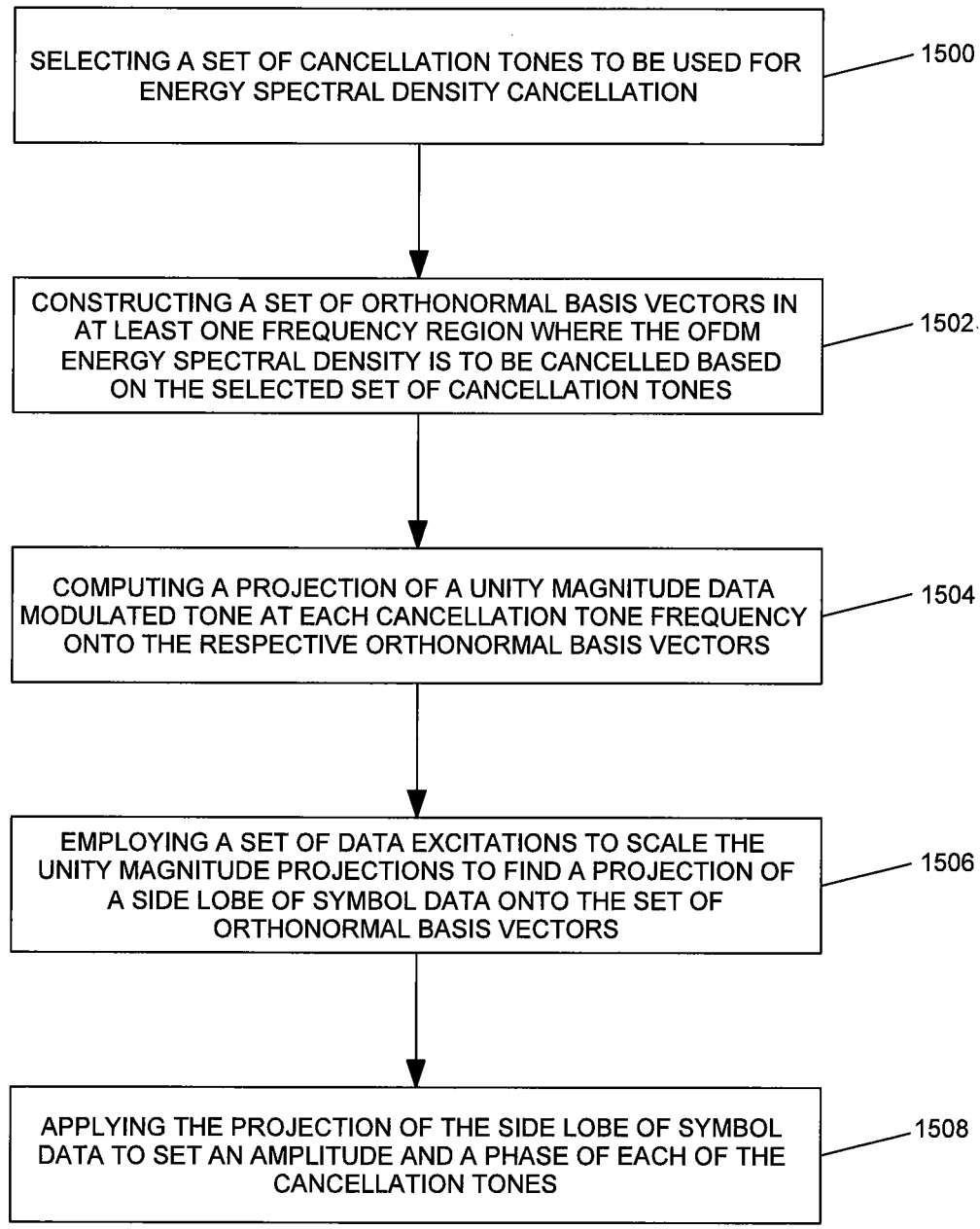

FIG. 15 illustrates another preferred process in accordance with the present invention.

Box 1500 illustrates selecting a set of cancellation tones to be used for energy spectral density cancellation.

Box 1502 illustrates constructing a set of orthonormal basis vectors in at least one frequency region where the OFDM energy spectral density is to be cancelled based on the selected set of cancellation tones.

Box 1504 illustrates computing a projection of a unity magnitude data modulated tone at each cancellation tone frequency onto the respective orthonormal basis vectors.

Box 1506 illustrates employing a set of data excitations to scale the unity magnitude projections to find a projection of a side lobe of symbol data onto the set of orthonormal basis vectors.

Box 1508 illustrates applying the projection of the side lobe of symbol data to set an amplitude and a phase of each of the cancellation tones.

CONCLUSION

The present invention comprises methods for suppressing Orthogonal Frequency Division Multiplexing (OFDM) energy spectral density. A method in accordance with the present invention comprises transmitting data tones and at least one guard tone in a frequency band, and energizing the at least one guard tone wherein an extended spectral energy side lobe of the at least one guard tone cancels at least one extended spectral energy side lobe of the plurality of data tones in a specified region of the frequency band.

Such a method further optionally comprises the specified region of the frequency band being adjacent to a band edge of the frequency band, a plurality of guard tones are energized, the plurality of guard tones are selected based on a characteristic of the selected guard tones, and the characteristic is an orthogonality of the selected guard tones.

Another method in accordance with the present invention comprises selecting a set of cancellation tones to be used for energy spectral density cancellation, constructing a set of orthonormal basis vectors in at least one frequency region where the OFDM energy spectral density is to be cancelled based on the selected set of cancellation tones, computing a projection of a unity magnitude data modulated tone at each cancellation tone frequency onto the respective orthonormal basis vectors, employing a set of data excitations to scale the unity magnitude projections to find a projection of a side lobe of symbol data onto the set of orthonormal basis vectors, and applying the projection of the side lobe of symbol data to set an amplitude and a phase of each of the cancellation tones.

Such a method further optionally includes the set of cancellation tones are selected from a guard band of frequencies, at least one of the tones in the set of cancellation tones is selected from the guard band of frequencies, a frequency spectrum in the OFDM energy spectral density comprises a stay out zone, tones in the set of cancellation tones are selected from a first guard band and a second guard band, the first guard band is in a frequency spectrum immediately below the OFDM data band and the second guard band is in a frequency spectrum immediately above the OFDM data band, and the set of cancellation tones consists of either eight or fourteen cancellation tones.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents of the claims appended hereto.

What is claimed is:

1. A method for suppressing Orthogonal Frequency Division Multiplexing (OFDM) energy spectral density for a plurality of data tones in a frequency band, comprising:
   constructing a set of orthonormal basis vectors in at least one frequency region where the OFDM energy spectral density is to be cancelled;
   setting an amplitude and phase of a guard tone based on the orthonormal basis vectors; and
   energizing the guard tone wherein an extended spectral energy side lobe of the guard tone cancels at least one extended spectral energy side lobe of the plurality of data tones.

2. The method of claim 1, wherein the plurality of data tones are adjacent to a band edge of the frequency band.

3. The method of claim 1, wherein a plurality of guard tones are energized.

4. The method of claim 3, wherein the plurality of guard tones are selected based on an orthogonality of the selected guard tones.

5. A method for canceling Orthogonal Frequency Division Multiplexing (OFDM) energy spectral density, comprising:
   constructing a set of orthonormal basis vectors in at least one frequency region where the OFDM energy spectral density is to be cancelled based on a selected set of cancellation tones;
   computing a projection of a unity magnitude data modulated tone at each cancellation tone frequency onto the respective orthonormal basis vectors;
   scaling the unity magnitude projections to find a projection of a side lobe of symbol data onto the set of orthonormal basis vectors; and
   applying the projection of the side lobe of symbol data to set an amplitude and a phase of each of the cancellation tones.

6. The method of claim 5, wherein the set of cancellation tones are selected from a guard band of frequencies.

7. The method of claim 5, wherein at least one of the tones in the set of cancellation tones is selected from a guard band of frequencies.

8. The method of claim 7, wherein a frequency spectrum in the OFDM energy spectral density comprises a stay out zone.

9. The method of claim 8, wherein tones in the set of cancellation tones are selected from a first guard band and a second guard band.

10. The method of claim 9, wherein the first guard band is in a frequency spectrum immediately below the OFDM data band and the second guard band is in a frequency spectrum immediately above the OFDM data band.

11. The method of claim 10, wherein the set of cancellation tones consists of fourteen cancellation tones.

12. The method of claim 6, wherein tones in the set of cancellation tones are selected from a first guard band and a second guard band.

13. The method of claim 12, wherein the first guard band is in a frequency spectrum immediately below the OFDM data band and the second guard band is in a frequency spectrum immediately above the OFDM data band.

14. The method of claim 13, wherein the set of cancellation tones consists of eight cancellation tones.

15. A method for canceling Orthogonal Frequency Division Multiplexing (OFDM) energy spectral density, comprising:
   constructing a set of orthonormal basis vectors based on a selected set of cancellation tones;
   computing a projection of a unity magnitude data modulated tone at each cancellation tone frequency onto the respective orthonormal basis vectors;
   finding, from the projection of the unity magnitude data modulated tone, a projection of a side lobe of symbol data onto the set of orthonormal basis vectors; and
   applying the projection of the side lobe of symbol data to set an amplitude and a phase of each of the cancellation tones.

16. The method of claim 15, wherein the set of cancellation tones are selected from a guard band of frequencies.

17. The method of claim 15, wherein at least one of the tones in the set of cancellation tones is selected from a guard band of frequencies.

18. The method of claim 17, wherein a frequency spectrum in the OFDM energy spectral density comprises a stay out zone.

19. The method of claim 18, wherein tones in the set of cancellation tones are selected from a first guard band and a second guard band.

20. The method of claim 19, wherein the first guard band is in a frequency spectrum immediately below the OFDM data band and the second guard band is in a frequency spectrum immediately above the OFDM data band.

* * * * *